United States Patent
Rajput

(10) Patent No.: US 7,496,746 B2
(45) Date of Patent: Feb. 24, 2009

(54) AUTOMATED CONFIGURATION OF A SOFTWARE SYSTEM

(75) Inventor: Manjit Singh Rajput, Bangalore (IN)

(73) Assignee: Sap AG, Walldorf (DE)

( * ) Notice: Subject to any disclaimer, the term of this patent is extended or adjusted under 35 U.S.C. 154(b) by 522 days.

(21) Appl. No.: 11/216,705

(22) Filed: Aug. 30, 2005

(65) Prior Publication Data
US 2007/0150865 A1 Jun. 28, 2007

(51) Int. Cl.
*H04L 12/28* (2006.01)

(52) U.S. Cl. ................. 713/100; 713/1; 713/2

(58) Field of Classification Search ........ 713/1, 713/2, 100
See application file for complete search history.

(56) References Cited

U.S. PATENT DOCUMENTS

| | | | | |
|---|---|---|---|---|
| 5,959,625 A | * | 9/1999 | Betrisey et al. | 715/766 |
| 2002/0016757 A1 | * | 2/2002 | Johnson et al. | 705/36 |
| 2005/0119031 A1 | * | 6/2005 | Spalink et al. | 455/566 |
| 2005/0261975 A1 | * | 11/2005 | Carver | 705/22 |
| 2006/0274719 A1 | * | 12/2006 | Guido et al. | 370/351 |

* cited by examiner

*Primary Examiner*—Abdelmoniem Elamin
(74) *Attorney, Agent, or Firm*—Kenyon & Kenyon LLP

(57) ABSTRACT

The automated configuration of a software system includes receiving natural language configuration instructions which may be from a user configuration document. A user enters or selects the appropriate configuration data into the document. The natural language instructions are converted to system-level language instructions for the software system. In converting the instructions, the conversion may be directed to a particular software system or may be applicable to any number of systems. For each system, system-level language instructions allow for the specific configuration. The system-level language instructions are then provided to the corresponding software system. The system, in response to the instructions, then configures itself. The system-level language instructions include any configuration values in addition to the configuration data. Therefore, from a user's perspective, the user enters configuration requirements in a natural language template and the underlying software system is correspondingly configured.

26 Claims, 4 Drawing Sheets

US 7,496,746 B2

AUTOMATED CONFIGURATION OF A SOFTWARE SYSTEM

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to the configuration of a software system and more specifically to the automated adjustment of a software system using user-specific configurations.

In existing software systems, a user must manually navigate menus and submenus to personally configure the system. The software system may be a general system, such as an operation system or a platform application. The software system may also be one or more software applications executed on the operating system or platform.

With the complexity and variety of different software systems, customization can be extremely problematic. First off, there are no standardized approaches for customizing a system, so the user must repeat these operations for each system. Secondly, configuration is typical a verbose process requiring significant navigation within the application and at times potentially a fair amount of knowledge about the system itself.

Configuration instructions for the system are typically found in a manual or user guide. Current systems provide the benefit of electronic manuals which may be viewable using the system itself, when the system is an application or an application running on the system when the system is an operating system or a platform.

These manuals include detailed instructions for multiple steps to be performed to complete a particular configuration. For example, a first step may be to select a particular menu option. The second step may be to select a particular submenu option. The third step may be to select a particular tab within a pop-up window generated by the submenu option. The fourth step may be to select a particular field visible based on the tab selection. The fifth step may be to toggle a value within the selected field. The sixth and final step may be to select an "ACCEPT" button.

In some existing systems, the electronic manual works in conjunction with the system being configured and may provide automated navigation to a particular submenu. For example, an active link may be provided in the electronic manual for a user to circumvent sub-menu navigation and go directly to a particular screen. Although, this is typically only one step of the configuration, so the user must then revert back to the manual to complete further steps. The user must repeat this process for each step, in the proper sequence, until the configuration is manually completed. For multiple systems, the user must then repeat this process for each system.

The current technique for customizing a software system is not only cumbersome, but can also be error prone. The user must manually follow the written instructions to perform the task while actively switching between an instruction window and one or more input screen. If a user improperly performs a particular step, this could cause significant confusion, requiring a user to retrace or re-execute the configuration steps.

The problem of system configuration is further enhanced by the significant number of a systems that a user typically encounters. In a multi-system processing environment, a user may access a significant number of systems, such as a word processing system, a billing system, an electronic communication system, an inventory system and many more.

Problems that arise with a single system configuration are only increased when dealing multiple systems having varying configuration processes, especially if a user is required to manually configure each system.

DETAILED DESCRIPTION

The automated configuration of a software system includes receiving natural language configuration instructions. Those instructions are included within a user configuration document that may be a template for receiving configuration data. A user is presented with a list of configuration options through a list of configuration documents. Upon selection of a particular document, the user then enters or selects the appropriate configuration data.

Once the input of the configuration data is complete, the natural language instructions are converted to system-level language instructions for the software system. In converting the instructions, the conversion may be directed to a particular software system or may be applicable to any number of systems. For each system, system-level language instructions allow for the specific configuration.

The system-level language instructions are then provided to the corresponding software system. The system, in response to the instructions, then configures itself. The system-level language instructions include any configuration values in addition to the configuration data. Therefore, from a user's perspective, the user enters configuration requirements in a natural language template and the underlying software system is correspondingly configured.

Figure 1:
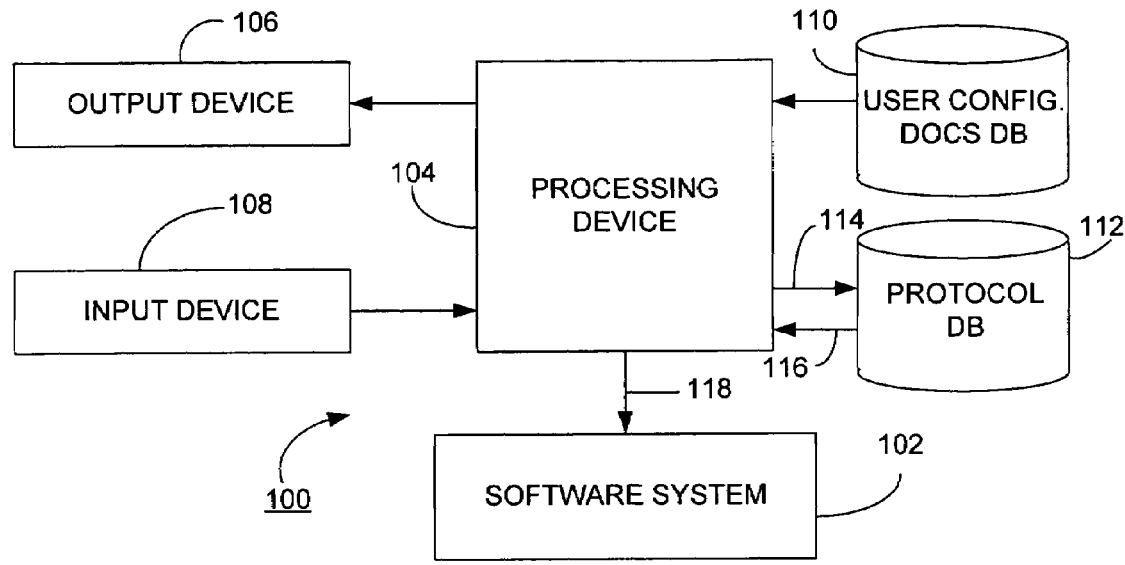
FIG. 1 illustrates a block diagram of one embodiment of an apparatus for the automated configuration of a software system.

FIG. 1 illustrates one embodiment of an apparatus 100 for the automated configuration of a software system 102. The apparatus 100 includes a processing device 104, an output device 106, an input device 108, a user configuration documents database 110 and a software system protocol database 112. The processing device 104 operates in response to executable instructions to perform operations providing for configuring the software system 102.

The software system 102 is a stand-alone element in FIG. 1 for illustrated purposes only. It is recognized that the system 102 may be a software processing environment such as a software platform or operating system having one or more applications executed thereon. The system 102 may also be an application or a suite of applications which execute on one or more platforms. The processing device 104, while executing the operating instructions for allowing the configuration of the software system 102, may also execute one or more software systems, including applications and/or processing environments. Therefore, in some embodiments, the software system 102 may be incorporated within the processing device 104. Whereas, in other embodiments the device 104 may operate ancillary to the system 102.

In one embodiment, the processing device 102 provides a list of user configuration documents to the output device 106, such as a display device or any other suitable output device. As discussed below, through the input device 108 and the output device 106, user configuration requests are provided to the natural language instructions of the configuration document.

Once complete, the processing device 104 accesses the protocol database 112 with a retrieve request 114 to retrieve system protocols 116 stored therein. The system protocols 116 may be instructions or system encodings relating to particular components of the software system. For example, the protocol may include adjustable or customizable system parameters that can be set to a particular value. In another example, the protocol may be instructions relating to performing a specific task.

The protocols are designed in conjunction with the natural language instructions to provide corresponding functionality. For example, the functional language instructions may be interpreted by the processing device to retrieve the proper protocol from the protocol database so that natural language instructions are converted into encoded instructions usable by the processing device.

In one embodiment, the processing device further includes a converter to convert the natural language instructions into system-level instructions based on the protocols in the protocol database. Using the protocols, the natural language instructions are converted to an encoded instruction, as discussed in further detail below. The encoded instruction is then converted into the system-level language instructions readable and executable by the software system 102. The system-level language instructions 118 are then provided to the software system 102 to update the appropriate system parameters. In one embodiment, system parameters are converted in accordance with the system-level language instructions and configuration data is written in place of existing system parameters. In another embodiment, the system-level language instructions may be executable instructions running on or in conjunction with the software system for configuring the system.

Figure 2:
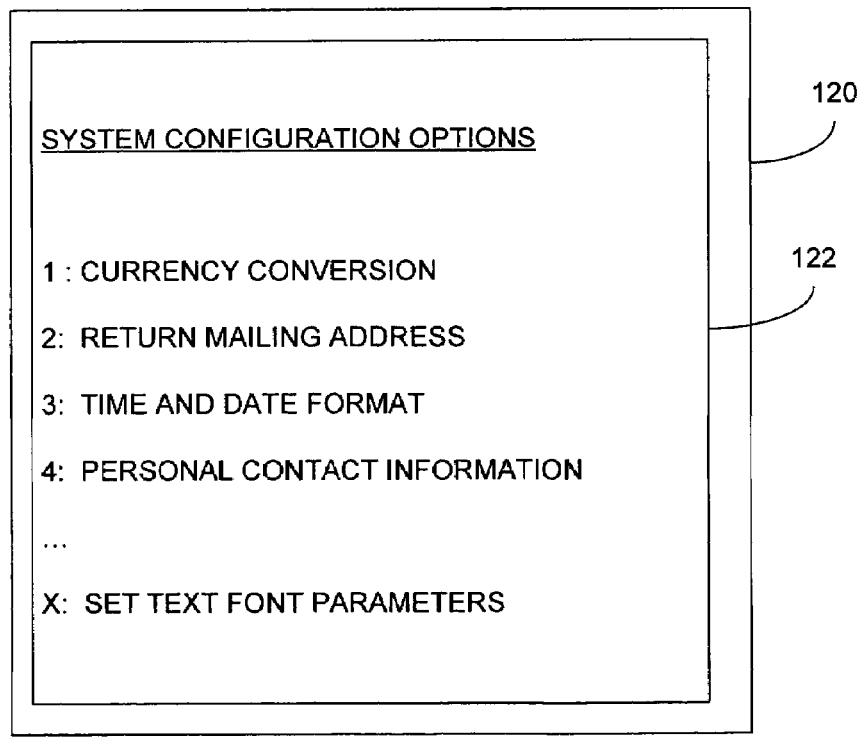
FIG. 2 illustrates a display of a screen shot of a list of user configuration documents.

FIG. 2 illustrates a representative list of user configuration documents 120. The list 120 represents configuration documents available, such as from the database 110 or any other source. The documents in the list 120 may be active links allowing a user to manually select a document, the user may enter a corresponding indicator, such as a number or letter, or any other suitable technique may be used to select a particular document.

A user, through the input device 108, selects one of the configuration documents from the list 120. The processing device 104 receives the input and retrieves the corresponding configuration document from the database 110. The document is then provided to the output device 106, such as for display when the output device 106 is a display screen.

Figure 3:
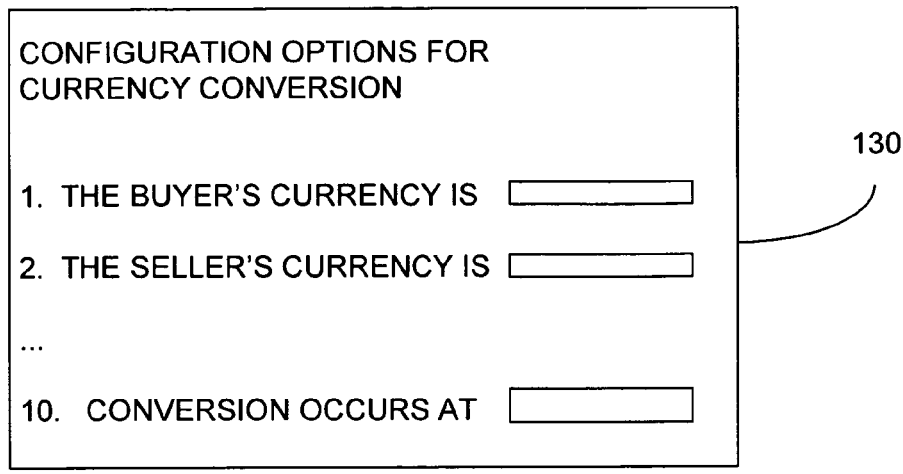
FIG. 3 illustrates a display of one embodiment of a user configuration list.

FIG. 3 illustrates a representative display of the user configuration document 130. By way of example, assume a user selected the first configuration document in the list 120 of FIG. 2, the currency conversion document. The corresponding configuration document 130 illustrated in FIG. 3 includes multiple user inquiries related to currency conversion. In one embodiment, the configuration document is a text file, readable by any suitable application. If the document is a text file, a user may manually enter the corresponding information in a natural language fashion. For example, in the document 130 of FIG. 3, the first component requests a buyer's currency type. In the natural language fashion, the user may simply enter the corresponding currency type using the input 108. The user may repeat this process until the document 130 is completed.

Figure 4:
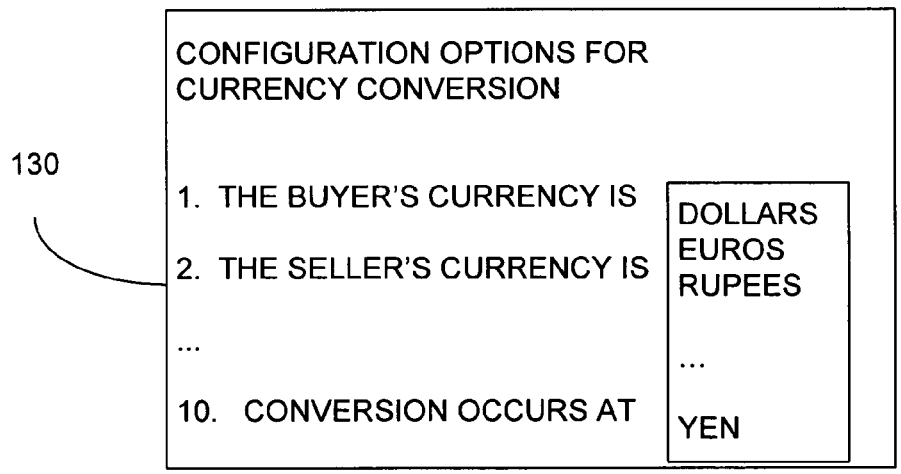
FIG. 4-6 illustrate displays a user configuration document relating to currency conversion in various stages of completion from user input.
Figure 5:
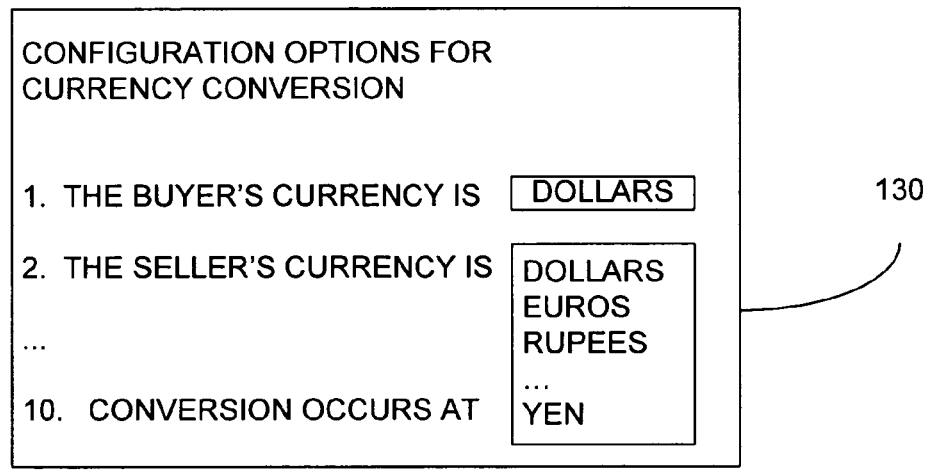
Figure 6:
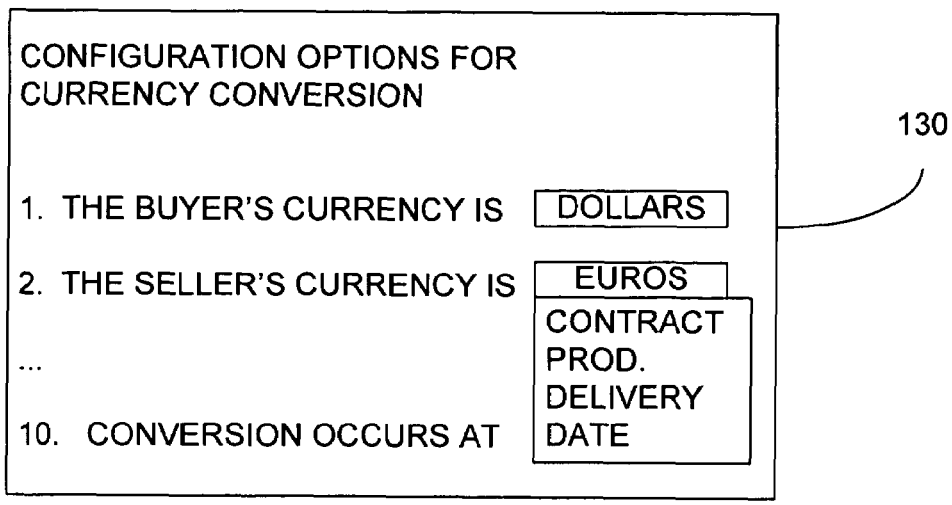

In another embodiment, as illustrated in FIGS. 4-6, the configuration document may be an interactive document. The document 130 may be encoded using a mark-up language or any other technique. The processing device 104 provides for the output of the document 130 on the display 106 by executing an underlying software application to display the document 130, such as a browser or a text editor application.

In the example of FIGS. 4-6, the document 130 for currency conversion includes a pull-down menu for answer selection. Addressing the first question on the document, a buyer's currency, the pull down menu includes any suitable number of choice, such as dollars, euros, rupees, yen, etc. Through the input device 108, a currency type is selected.

As illustrated in the display of the document 130 in FIG. 5, the selected currency type for the first component is dollars. The user then proceeds to the second component, another natural language inquiry. The second component requests the selection of the seller's currency. Once again, a pull down menu provides a selection of available currencies. Similar to the selection of the currency type for the first inquiry, a selection is received from the input device 108. The processing device 104 receives the selection and inserts the selected currency type in the second component, similar to the first currency selection.

The steps are repeated for all corresponding natural language inquiries on the user configuration document 130. Illustrated in FIGS. 3-6, this exemplary embodiment includes ten (10) different natural language questions, which are used for subsequent system configurations.

FIG. 6 illustrates the display of the final inquiry of the configuration document 130, directed to when the conversion may occur. In this example configuration document 130 may be applicable to an inventory or sales system, so the currency conversion can occur at any number of transaction times. The user, through the output device 106, is given several options, such as at the time the contract is executed, when the product is manufactured, when delivery occurs or at a specific user-specified date, where the user may enter in the configuration document 130 or be queried when a particular function operates in the corresponding system 102.

Similar to the selection of the other configuration instructions, the final inquiry is answered. In addition to selecting terms to complete the natural language instructions, the configuration document 130 may also include configuration values associated with those instructions. For example, if the user selected a particular date in response to the final natural language inquiry, the user may therein manually enter a particular date, designated by date, month and year. These inputs are configuration data that is used as a specific value in addition to the natural language instructions.

Figure 7:
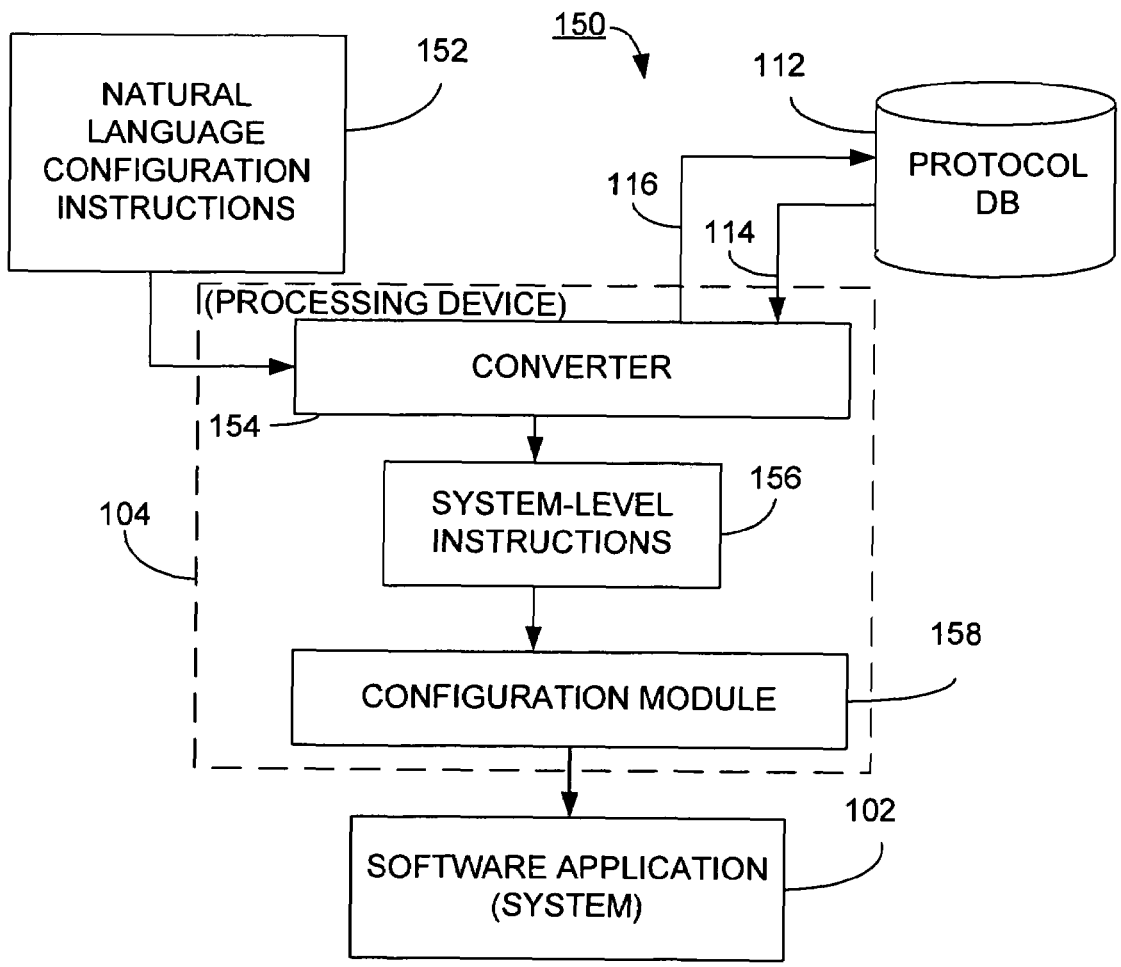
FIG. 7 illustrates a block diagram of another embodiment of the apparatus for automated configuration of the software system.

FIG. 7 illustrates a block diagram of another embodiment of an apparatus 150 for automated software configuration. The processing device 104 is coupled to the software system 102 and the protocol database 112. The processing device 104 receives natural language configuration instructions 152. The instructions 152 may be the encoded configuration document 130 of FIGS. 3-6.

Within the processing device 104, a converter 154 receives the instructions 152. The converter 154 may be a software module working on the processing device 104 in conjunction with the protocol database 112 to retrieve the proper protocols 116 using requests 114. The converter 154 may deconstruct the natural language instruction by referencing particular terms to determine the encoded instruction. For example, using the first query of the currency configuration document, the converter 154 may parse out the terms "buyer," "currency" and "dollars." The converter 154 may parse out the next terms "seller," "currency" and "euros." The converter 154 continues this process and based on a reference table, may determine the proper protocols 114 to retrieve from the database 112.

Continuing with the example of currency conversion, the protocol 114 may include corresponding system-level language instructions. These instructions may be assembled by the converter 154 to generate a complete set of instructions. For example, a protocol for currency conversion may include instructions related to setting several system 102 variables, so the instructions may be system-level language instructions to perform this feature, setting a variable. Similarly, if the configuration includes setting to a particular value, the converter 154 may extract the configuration values and insert them in the instructions as needed. In the example of the user entering a particular conversion date, a protocol may include instructions to set a conversion date to a date based on the configuration value.

The converter 154 generates system-level language instructions 156 based on the natural language configuration instructions 152. These system-level language instructions 156 are provided to a configuration module 158, which in one embodiment is disposed on the processing device 104. This module 158 may also be disposed in another processing system, such as a processing system having the software system 104 executing thereon. The module 158 provides for a direct interface with the system 102 for automatically configuring the system 102.

When appropriate, the module 158 provides the instructions 158 to the software system 102. The software system 102 thereupon executes the instructions, updating the system in response to user configuration requests. In one embodiment, the configuration module 158 may execute the system-level instructions to provide configuration commands, such as a first command to set a first system value, a second command to enable a particular feature, a third command to select a particular element and so on. Through the configuration module 158, the processing device 104 is operative to automatically configure the software system 102 based on the converted natural language configuration instructions 152.

Figure 8:
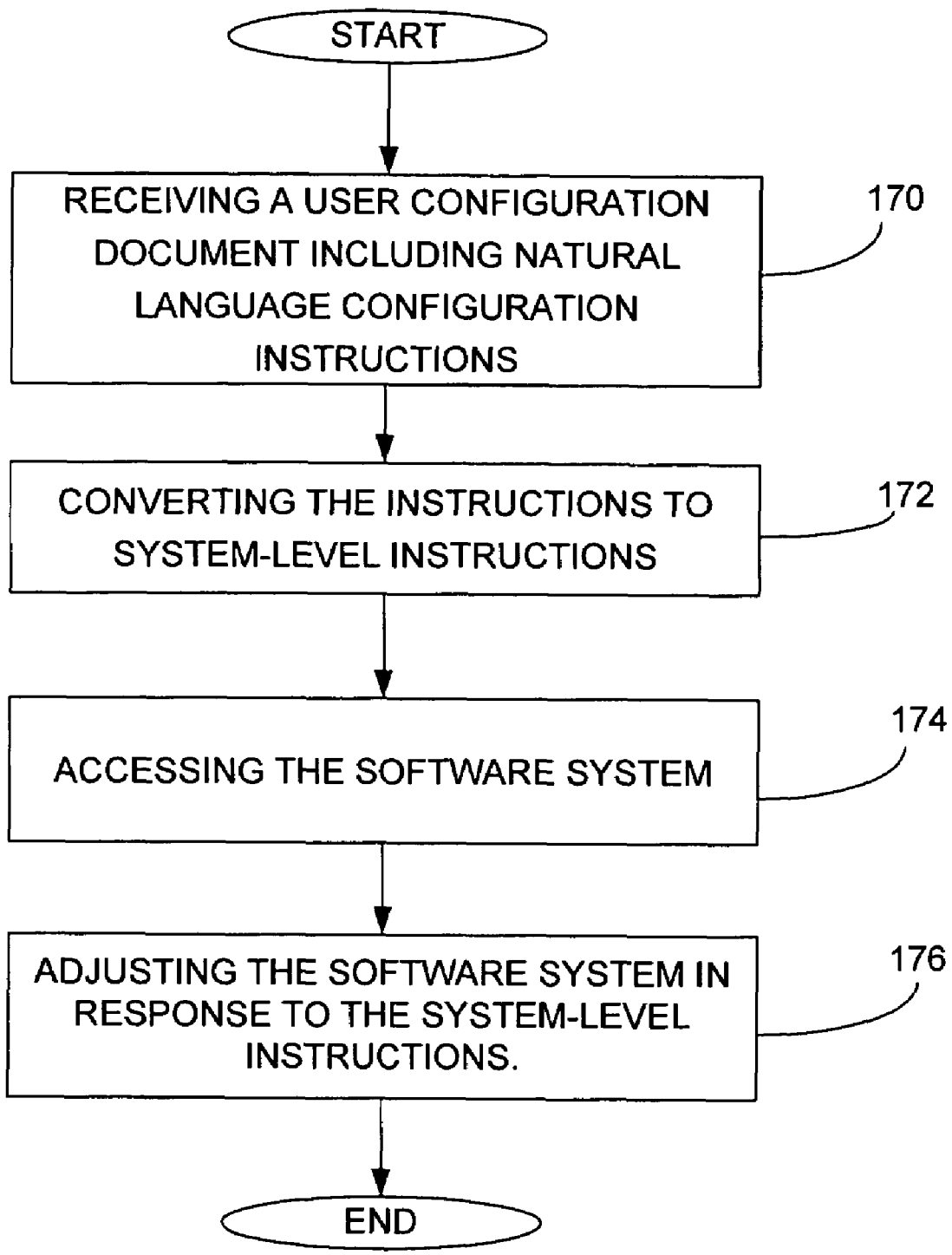
FIG. 8 illustrates a flowchart of the steps of one embodiment of a method for the automated configuration of the software system.

FIG. 8 illustrates the steps of one embodiment of a method for the automated configuration of a software system, such as the system 104 of FIG. 1. The method begins, step 170, by receiving a user configuration document that includes natural language configuration instructions. As discussed above, the document may be an electronic file having encoding, which when viewed by an appropriate application, provides for the display of natural language instructions directed to a user configuration. In one embodiment, prior to step 170, a user may be presented with a list of user configuration documents and a processing device receives a selection command to select one of the configuration documents. In this embodiment, the instructions may be received in accordance with above-described technique in FIGS. 1-7.

The next step, step 172, is converting the instructions to system-level instructions. This may be performing using the converter 154 in conjunction with the protocol database 112. The next step, step 174, is accessing the software system. This step may be performed by the configuration module 158 in the processing device 104, as illustrated in FIG. 7.

The next step, step 176, is configuring the software system in response to the system-level instructions. This step may be performed by the configuration module 158 providing the system-level instructions or this step may be performed by operations within the software system 102 itself. Thereupon, the method is complete, providing for the automatic configuration of the software system 102 through the processing device 102 receiving natural language instructions in the user configuration document.

It is recognized that other embodiments and variations exist within the scope of the present invention. For example, a user may manually type natural language instructions instead of filling in an existing document. In this embodiment, further refinements may be utilized in the converter 154 of FIG. 7 to provide translation from the natural language instructions 152 to the system-level instructions 156. This embodiment may utilize further interaction with the user to confirm the proper interpretation of the natural language instructions, as recognized by one having ordinary skill in the art.

In another embodiment, the configuration document may be presented to a user in response to a user configuration inquiry. For example, a user might navigate a help menu regarding a particular task. Within the help menu may be an active link or other indicator of a corresponding configuration document. The configuration document may thereupon be presented to the user from inside a help menu or other user guide document.

The automated configuration is further available to multiple systems in a multi-system environment. Based on different protocols, any suitable number of system-level instructions may be generated for the different systems. One example of a multi-system environment may be interaction between am inventory system and a billing system. Using the above example of currency conversion, protocols may be used to generate system-level instructions for both the inventory system and the billing system using the same natural language instruction.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. An apparatus for the automated configuration of a software system, the apparatus comprising:

an output device to provide a list of a plurality of user configuration documents to a user, each user configuration document having a different set of natural language configuration instructions; and
a processing device operative to:
receive at least one of the plurality of user configuration documents including the natural language configuration instructions;
convert the instructions to system-level instructions;
access the software system; and
configure the software system in response to the system-level instructions.

2. The apparatus of claim 1, the output device is coupled to the processing device, the processing device further operative to provide the list of user configuration documents to the output device; and
wherein the apparatus further comprises an input device coupled to the processing device, the processing device operative to receive a selection command selecting the at least one user configuration document from the list.

3. The apparatus of claim 2, wherein the processing device is further operative to:
prompt the user with a configuration query, using the output device; and
receive configuration responses from the input device.

4. The apparatus of claim 3, wherein the processing device is further operative to insert the configuration responses into the at least one user configuration document.

5. The apparatus of claim 3, wherein prompting the user includes displaying the at least one user configuration document on the output device, the document having data fields for user input of the configuration responses into the input device.

6. The apparatus of claim 1, wherein the at least one user configuration document is a text file.

7. The apparatus of claim 1, wherein the processor is further operative to:
receive configuration data associated with the natural language configuration instructions from the input device; and
associate the configuration data with the system-level instructions.

8. The apparatus of claim 7, wherein the processing device is further operative to configure the software system by updating values consistent with the configuration data.

9. The apparatus of claim 1 further comprising:
a protocol database having system configuration protocols stored therein; and
the processing device, while converting the natural language instructions to system-level instructions, references the protocol database.

10. A method for the automated configuration of a software system, the method comprising:
providing, by an output device, a list of a plurality of user configuration documents to a user, each user configuration document having a different set of natural language configuration instructions;
receiving, by a processor, at least one of the plurality of user configuration documents including the natural language configuration instructions;
converting the instructions to system-level instructions;
accessing the software system; and
configuring the software system in response to the system-level instructions.

11. The method of claim 10 further comprising:
receiving a selection command selecting the at least one of the user configuration document from the list.

12. The method of claim 11 further comprising:
prompting the user with at least configuration query; and
receiving one more configuration responses in response to the configuration query.

13. The method of claim 12 further comprising:
inserting the configuration responses into the at least one user configuration document.

14. The method of claim 12 wherein the step of prompting the user includes displaying the at least one user configuration document having data fields for user input of the configuration responses.

15. The method of claim 10 wherein the at least one user configuration document is a text file.

16. The method of claim 10 further comprising:
receiving configuration data associated with the natural language configuration instructions; and
associating the configuration data with the system-level instructions.

17. The method of claim 16 further comprising:
adjusting the software system to update values consistent with the configuration data in response to the executable instructions.

18. The method of claim 10 the step of converting the instructions to system-level instructions includes referencing predetermined system configuration protocols.

19. A method for the automated configuration of a software system, the method comprising:
providing to a user a list of a plurality of user configuration documents, each user configuration document having a different set of natural language configuration instructions;
providing to the user at least one of the user configuration documents that includes a template of the natural language configuration instructions;
receiving a completed user configuration document that includes configuration data inserted in the template;
converting the instructions having the data therein into system-level instructions by referencing predetermined system configuration protocols;
accessing the software system; and
configuring the software system in response to the system-level instructions.

20. The method of claim 19 further comprising:
receiving a selection command selecting the at least one of the user configuration document from the list.

21. The method of claim 20 further comprising:
prompting the user with at least configuration query; and
receiving the configuration data in response to the configuration query.

22. The method of claim 21 wherein the step of prompting the user includes displaying the at least one user configuration document having data fields for user input of the configuration responses.

23. The method of claim 22 wherein the at least one user configuration document is a text file.

24. The method of claim 19 further comprising:
adjusting the software system to update values consistent with the configuration data.

25. The apparatus of claim 1, wherein the processor is configured to parse out predetermined terms from the natural language instructions.

26. The apparatus of claim 1, wherein the processor is configured to select a protocol from a protocol database and convert the natural language instructions to the system-level instructions based on the selected protocol.

* * * * *